(12) United States Patent
Brik et al.

(10) Patent No.: US 10,397,080 B2
(45) Date of Patent: Aug. 27, 2019

(54) SECURE WIRELESS NETWORK USING RADIOMETRIC SIGNATURES

(71) Applicant: Wisconsin Alumni Research Foundation, Madison, WI (US)

(72) Inventors: Vladimir Alexander Brik, Madison, WI (US); Suman Banerjee, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 0 days.

(21) Appl. No.: 15/600,220

(22) Filed: May 19, 2017

(65) Prior Publication Data

US 2017/0257300 A1 Sep. 7, 2017

Related U.S. Application Data

(63) Continuation of application No. 12/555,369, filed on Sep. 8, 2009, now abandoned.

(60) Provisional application No. 61/097,406, filed on Sep. 16, 2008, provisional application No. 61/095,216, filed on Sep. 8, 2008.

(51) Int. Cl.
| | |
|---|---|
| *H04L 12/26* | (2006.01) |
| *H04L 12/747* | (2013.01) |
| *H04L 12/813* | (2013.01) |
| *H04L 29/06* | (2006.01) |

(52) U.S. Cl.
CPC ........ *H04L 43/0835* (2013.01); *H04L 43/028* (2013.01); *H04L 43/04* (2013.01); *H04L 45/742* (2013.01); *H04L 47/20* (2013.01); *H04L 69/22* (2013.01); *H04L 69/12* (2013.01); *Y02D 30/40* (2018.01)

(58) Field of Classification Search
None
See application file for complete search history.

(56) References Cited

U.S. PATENT DOCUMENTS

| | | | | |
|---|---|---|---|---|
| 5,329,591 A | * | 7/1994 | Magrill | H04W 8/22 375/130 |
| 5,440,758 A | | 8/1995 | Grube et al. | |
| 5,706,307 A | | 1/1998 | Gaspard | |
| 5,715,518 A | | 2/1998 | Barrere et al. | |
| 5,893,031 A | * | 4/1999 | Hoogerwerf | H04L 63/08 455/410 |
| 5,905,949 A | | 5/1999 | Hawkes et al. | |
| 5,970,405 A | * | 10/1999 | Kaplan | H04W 12/12 455/410 |
| 5,987,316 A | * | 11/1999 | Gordon | H04W 12/06 455/411 |

(Continued)

OTHER PUBLICATIONS

Chang (Kai Chang, RFnd Microwave Wireless Systems, ISBN 0-471351-99-7, 6/00).*

(Continued)

*Primary Examiner* — Piotr Poltorak
(74) *Attorney, Agent, or Firm* — Boyle Fredrickson, S.C.

(57) ABSTRACT

A network security system for wireless devices derives a fingerprint from the modulation imperfections of the analog circuitry of the wireless transceivers. These fingerprints may be compared to templates obtained when the wireless devices are initially commissioned in a secure setting and used to augment passwords or other security tools in detecting intruders on the network.

19 Claims, 4 Drawing Sheets

(56) References Cited

U.S. PATENT DOCUMENTS

| | | | |
|---|---|---|---|
| 5,999,806 A | | 12/1999 | Kaplan et al. |
| 5,999,807 A | * | 12/1999 | Kaplan .................. H04M 1/67 379/189 |
| 6,035,188 A | | 3/2000 | Hoogerwerf et al. |
| 6,101,168 A | * | 8/2000 | Chen .................... H04L 1/0001 370/228 |
| 6,269,246 B1 | | 7/2001 | Rao et al. |
| 6,385,448 B1 | | 5/2002 | Beckman et al. |
| 6,396,818 B1 | | 5/2002 | Kolev et al. |
| 6,437,735 B1 | | 8/2002 | McMahan |
| 6,748,036 B1 | | 6/2004 | Tsuruinaru |
| 6,765,473 B1 | * | 7/2004 | Pavatich ............ G07C 9/00182 340/13.26 |
| 6,915,123 B1 | | 7/2005 | Daudelin |
| 7,035,593 B2 | * | 4/2006 | Miller .................. G01R 29/02 375/340 |
| 7,408,898 B1 | * | 8/2008 | Brown ............... H04B 7/18515 370/250 |
| 7,639,806 B2 | | 12/2009 | Daniels et al. |
| 7,831,087 B2 | * | 11/2010 | Harville ............ G06K 9/00201 382/103 |
| 8,018,883 B2 | | 9/2011 | Bowser et al. |
| 8,176,533 B1 | | 5/2012 | Violleau et al. |
| 8,509,735 B2 | | 8/2013 | Thorson et al. |
| 2002/0034191 A1 | | 3/2002 | Shattil |
| 2002/0065048 A1 | | 5/2002 | Nagatani et al. |
| 2002/0118834 A1 | | 8/2002 | Wilson et al. |
| 2002/0196188 A1 | | 12/2002 | Holt |
| 2003/0008668 A1 | * | 1/2003 | Perez-Breva ......... G01S 5/0252 455/456.1 |
| 2003/0021582 A1 | | 1/2003 | Sawada |
| 2003/0110400 A1 | * | 6/2003 | Cartmell ................ H04L 51/12 726/4 |
| 2003/0227342 A1 | | 12/2003 | Liu |
| 2004/0015990 A1 | | 1/2004 | Suematsu et al. |
| 2004/0042531 A1 | * | 3/2004 | Arikan ................. H04B 1/7115 375/148 |
| 2004/0166818 A1 | * | 8/2004 | Karlsson ............... H04W 99/00 455/115.1 |
| 2004/0192361 A1 | | 9/2004 | Yossef et al. |
| 2005/0041759 A1 | * | 2/2005 | Nakano ................. H04L 25/061 375/324 |
| 2005/0143051 A1 | * | 6/2005 | Park ........................ H04L 12/66 455/406 |
| 2005/0163090 A1 | | 7/2005 | Aoki |
| 2005/0225396 A1 | | 10/2005 | Grebennikov et al. |
| 2006/0008029 A1 | | 1/2006 | Jafari et al. |
| 2006/0126754 A1 | | 6/2006 | Filimonov et al. |
| 2006/0136997 A1 | * | 6/2006 | Telek ..................... G01S 11/06 726/5 |
| 2006/0289622 A1 | * | 12/2006 | Khor ..................... G06Q 30/02 235/375 |
| 2007/0002846 A1 | * | 1/2007 | Rada ....................... H01Q 3/30 370/358 |
| 2007/0021080 A1 | * | 1/2007 | Kuriyama ............ H04B 1/0057 455/132 |
| 2007/0025245 A1 | * | 2/2007 | Porras .................. H04W 99/00 370/229 |
| 2007/0025265 A1 | * | 2/2007 | Porras .................. G06K 7/0008 370/252 |
| 2007/0178914 A1 | * | 8/2007 | Montenegro ......... G01S 5/0252 455/456.5 |
| 2007/0253499 A1 | | 11/2007 | Waters et al. |
| 2007/0264939 A1 | | 11/2007 | Sugar |
| 2007/0293163 A1 | * | 12/2007 | Kilpatrick ............ H04B 1/0483 455/84 |
| 2008/0024269 A1 | | 1/2008 | Watanabe et al. |
| 2008/0244707 A1 | * | 10/2008 | Bowser ............... H04L 63/1441 726/4 |
| 2009/0287764 A1 | * | 11/2009 | Pazhyannur .......... H04L 63/102 709/203 |

OTHER PUBLICATIONS

Agilent (Aiglent EVMa-2005, Hints for Making and Interpreting EVM Measurements, 5989-3144EN Appl. Note, Agilent Technologies, 2005).*

Wang (Wang et al., "VLSI Test Principles and Architectures Design for Testability", ISNB 13: 978-0-12-370597-6, 06).*

Poole (Ian Poole, "Modulation basics, par 2: Phase modulation", Adrio Communications Ltd, Staines, UK, 08).*

Brik (Brik et al., "Wireless Device Identification with Radiometric Signatures", MobiCom '08 Proceedings of the 14th ACM international conference on Mobile computing and networking, p. 116-127).*

Ron Hranac, "Digital Transmission, Part 2", Communications Technology, Jul. 2007.*

Rohde & Schwarz, "The right way to measure SNR and MER of digitally modulated signals with additive noise", Rohde & Schwarz, No. 178, 2003.*

Hall, Jeyanthi. et al., Radiofrequency Fingerprinting for Intrusion Detection in Wireless Networks, Jul. 12, 2005 (Draft) pp. 1-35, IEEE Transactions on Dependendeble and Secure Computing, IEEE, Piscataway, NJ, US.

Chandra et al.; Wireless Networking: Know it All: Sep. 2007; ISBN—13-978-0-7506-8582-5.

RadioElectronics.com, Comparison of 8-QAM, 32-QAM, 64-QAM, 28_QAM, 256-QAM, Types, Sep. 2014.

Kirkhorn; Introduction to IQ-demodulation of RF-data, Sep. 1999.

Wikipedia; In-phase and quadrature components, Nov. 2013.

RadioElectronics.com; Quadrature FM Dernodulator/Detector Tutorial; Aug. 2014.

Hall et al.; "Detection of rogue devices in bluetooth networks using radio frequency fingerprinting," In proceedings of the 3rd IASTED International Conference on Communications and Computer Networks, CCN, pp. 4-6. 2006, US.

Ureten et al.; "Bayesian detection of Wi-Fi transmitter RF fingerprints," Electronics Letters 41, No. 6 (2005): 373-374. US.

Hall et al.; "Detection of transient in radioradio>frequency fingerprinting using signal phase." Wireless and Optical Communications (2003): 13-18. US.

Banerjee et al.; "Spectrum Enforcement in a Spectrum Sharing World"; Jun. 2008: Congitive Wireless Networking Summit 2008: US.

Gralla; "How Wireless Works", 2nd Edition, ISBN 0789733447, Oct. 2005, p. 20-25, 30-43; US.

Xaio et al.; "Fingerprints in the ether: Using the physical layer for wireless authentication." In Communications, 2007. ICC'07. IEEE International Conference on, pp. 4646-4651. IEEE, 2007. US.

Langley, Lawrence E. "Specific emitter identification (SEI) and classical parameter fusion technology." In WESCON/'93, Conference Record pp. 377-381. IEEE, 1993. US.

Kohno et al.; "Remote physical device fingerprinting," IEEE Transactions on Dependable and Secure Computing 2, No. 2 (2005): 93-108 US.

Hall; "Detection of rogue devices in wireless networks." PhD Doctoral dissertation, pp. 1-293; Carleton University Ottawa, 2006. Canada.

Gerdes et al.; "Device Identification via Analog Signal Fingerprinting; A Matched Filter Approach." In NDSS. 2006.; . pp. 1-11; US.

Talbot et al.; "Specific emitter identification and verification." Technology Review (2003): pp. 113-132. US.

Remley et al.; "Electromagnetic signatures of WLAN cards and network security." In Signal Processing and Information Technology, 2005. Proceedings of the Fifth IEEE International Symposium on, pp. 484-488. IEEE, 2005. US.

Rasmussen et al.; "Implications of radio fingerprinting on the security of sensor networks." In Security and Privacy in Communications Networks and the Workshops, 2007. SecureComm 2007. Third International Conference on, pp. 331-340. IEEE, 2007 US.

Riezenman, Michael J.; "Cellular security: better, but foes still lurk." IEEE Spectrum 37, No. 6 (2000): pp. 39-42.; US.

(56) References Cited

OTHER PUBLICATIONS

Ureten et al.; "Wireless security through RF fingerprinting," Canadian Journal of Electrical and Computer Engineering 32. No. 1 (2007) pp. 27-33.; Canada.

* cited by examiner

SECURE WIRELESS NETWORK USING RADIOMETRIC SIGNATURES

CROSS-REFERENCE TO RELATED APPLICATIONS

This application claims the benefit of U.S. provisional application Nos. 61/097,406 filed Sep. 16, 2008 and 61/095,216 filed Sep. 8, 2008, and U.S. non-provisional application Ser. No. 12/555,369 filed Sep. 8, 2009, the entireties of which are herein incorporated by reference.

STATEMENT REGARDING FEDERALLY SPONSORED RESEARCH OR DEVELOPMENT

This invention was made with government support under 0520152 awarded by the National Science Foundation. The government has certain rights in the invention.
NSF 0520152
The United States government has certain rights in this invention.

BACKGROUND OF THE INVENTION

The present invention relates to security systems for computer networks and, in particular, to a security system for networks employing wireless communication links.

Providing security for data transmitted electronically over a computer network is important to prevent the theft of data or services, preserve privacy, and prevent the introduction of malware such as viruses. One common method of ensuring network security uses a "white list" of authorized users and checks the identity of network users against this list at the time the users enter the network and/or periodically during their connection.

Reliably determining the identity of a user connecting to the network is not a simple matter. One method is through the use of a personal identification number (PIN), password, or encryption key known only to the user. But such keys are often lost or stolen.

Additional security may be had by combining a user entered key, a machine identifier such as the MAC address of a network interface card, and a unique serial number assigned to each network interface card chip. Unfortunately, it is relatively easy to forge a MAC address. For this reason, more sophisticated machine/user identifiers may be used such as hardware fobs generating a series of pseudorandom numbers in parallel with similar hardware at a network gateway. All of these authenticating techniques, which allow the authentication to be implemented through data transmitted over the network, will be termed "network data implemented authenticators" because the authenticating information is conveyed using the data transmitting qualities of the network.

For highly secure networks, "network data implemented authenticators" may be supplemented with techniques that do not rely on the data conveyed by the network, for example limiting connection to the network to physically secure network jacks within a building. These measures are resistant to the loss or theft of passwords or hardware password devices.

This latter type of supplemental identification of the user is far more difficult with a wireless network which anticipates that users may be mobile and where it is difficult to contain the wireless signal within a building or controlled environment.

SUMMARY OF THE INVENTION

The present invention provides a system that extracts a nearly unique "fingerprint" of the wireless device from imperfections in its radio transmitter circuitry and then uses such fingerprints to identify the physical transmitting device for security-related purposes. The present invention operates primarily in the "modulation domain," i.e. at the last stages of conversion of analog signal to digital data in contrast to some radio transmitter identifications systems which represent device identity in the "waveform domain", i.e., based on information gathered in early stages of signal acquisition that do not take advantage of the signal properties due to modulation. A test of the present invention with off-the-shelf wireless network cards indicates that sufficient variation exists even with mass-produced wireless network cards to reliably differentiate cards from each other in a typical wireless environment subject to noise, multipath effects, and channel distortion.

Importantly, the exploited imperfections in the radio transmitters used for this identification are a product of the underlying difficulty and cost of controlling these imperfections, making the creation of a "mimic" for any particular transmitter card disproportionately expensive to someone who would breach the security of the network.

Significantly, too, all network communication over the wireless card must reveal the data necessary to extract the modulation domain fingerprint making this technique inescapable. At the same time, implementation of the invention does not require any modifications to the mobile wireless devices, making it easy to deploy in existing environments.

As an additional benefit, the modulation domain parameters that make up the fingerprint are extracted using a process very similar to that already used in existing transceivers, making implementation of the invention relatively simple and inexpensive.

In detail, then, the present invention provides a secure network transceiver system for communicating network data with a plurality of mobile transceivers, each mobile transceiver having a digital signal portion communicating with an analog radio portion. The secure network includes at least one base transceiver having: (1) an analog radio portion exchanging radio signals with the mobile transceivers, the analog radio portion providing modulation domain outputs reading modulation domain qualities of received radio signals from the mobile transceivers; (2) a digital signal portion communicating digital data with the analog radio portion related to encoded content of the radio signals; and (3) an electronic computer including a processor and a memory, the electronic computer exchanging network data related to the digital data with the digital signal portion and receiving modulation domain outputs from the analog radio portion.

The electronic computer executes a stored program contained in memory to: (1) execute an authentication process with mobile transceivers through the exchange of network data, the authentication process employing a network data authenticator; (2) characterize received radio signals of mobile transceivers according to the modulation domain qualities indicated by the modulation domain outputs; (3) compare the characterized radio signals to pre-established characterizations of authorized mobile transceivers; and (d) generate an output indicating a possible security violation when the characterized radio signals do not match pre-established characterizations to within a predetermined threshold.

It is thus an object of the invention to provide a method of uniquely identifying a wireless transmitter that is difficult to forge and that is inescapably revealed in network communications. It is another object of the invention to provide a method that does not require special modification of the wireless transmitters of mobile devices and thus is scalable at low cost.

The electronic computer may further execute the stored program to revoke authorization of mobile transmitters whose characterized radio signals do not match pre-established characterizations to within a predetermined threshold.

It is thus an object of the invention to provide a system that may automatically and rapidly stop security breaches.

The modulation domain qualities may be selected from the group consisting of measurements related to trajectory of a received signal's phasor in the modulation domain. Including, but not limited to symbol phase error, symbol magnitude error, and symbol error vector magnitude. Alternatively or in addition, measurements may be related to overall modulation-domain characteristics of a received signal including, but not limited to carrier frequency offset, symbol clock offset, SYNC correlation. It is thus an object of the invention to use fundamental characteristics of analog transmitter circuitry revealed in a radio signal that provide sufficient variation to serve as transmitter identification.

The comparison may provide a multidimensional comparison using multiple different modulation domain qualities.

Thus it is an object of the invention to produce a "fingerprint" that is extremely difficult to forge requiring the simultaneous control of multiple parameters of a radio transmitter that are normally electrically inter-dependent.

The network may include multiple base transceivers, and each of the base transceivers may use different pre-established characterizations each unique to one base transceiver receiver or the multiple base transceivers may share pre-established characterizations.

It is thus an object of the invention to provide a flexible trade-off between a simple commissioning process in which a set of measurements at one base station serve all base stations, and extremely precise radiometric characterization wherein each base transceiver creates a fingerprint unique to its own receiver characteristics.

The comparison of the characterized radio signals may employ comparison algorithms selected from the group consisting of: k-nearest-neighbor, support vector machines, decision trees, neural networks, Bayesian-based algorithms, polynomial classifiers, regression fitting, hidden Markov models, Gaussian mixture models, radial basis functions, classifier boosting, classifier ensembles.

Thus it is an object of the invention to provide high accuracy by using a sophisticated multidimensional comparison algorithm.

The electronic computer may further execute the stored program contained in memory to change a pre-established characterization fear a mobile transceiver on a periodic basis using recent transmissions when the characterization of the recent transmissions match existing characterizations to within a second predetermined threshold or when the characterization of the recent transmissions matches an original characterization to within a second predetermined threshold.

It is thus an object of the invention to permit tighter characterizations of mobile transceivers by accommodating slow evolution of transceiver parameters.

These particular objects and advantages may apply to only some embodiments falling within the claims, and thus do not define the scope of the invention.

DETAILED DESCRIPTION OF THE DRAWINGS

DETAILED DESCRIPTION OF THE PREFERRED EMBODIMENT

General Description of the Network

Figure 1:
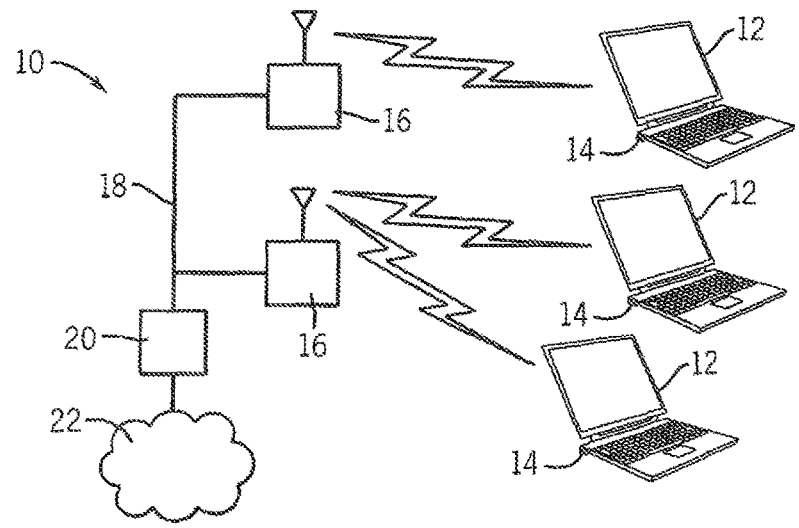
FIG. 1 is a representation of a simple wireless network having three multiple mobile users communicating with two base stations, the latter connected on a network with a central server.

Referring now to FIG. 1, an example network 10 suitable for use with the present invention employs multiple mobile devices 12, for example, laptop computers having wireless adapters 14 such as those employing the IEEE 802.11 wireless standard well known in the art. The present invention however is not limited to the IEEE 802.11 standard.

When connected in a network, the mobile devices 12 may communicate by radio waves over a wireless communication channel with one of two base stations 16 (typically stationary) that may in turn communicate on a wire or optical carrier medium 18 with a central server 20. The central server 20 may have additional connections, for example, to a secure institutional network 22. In this way the mobile devices 12 may flexibly connect to the secure institutional network 22.

Transceiver

Figure 2:
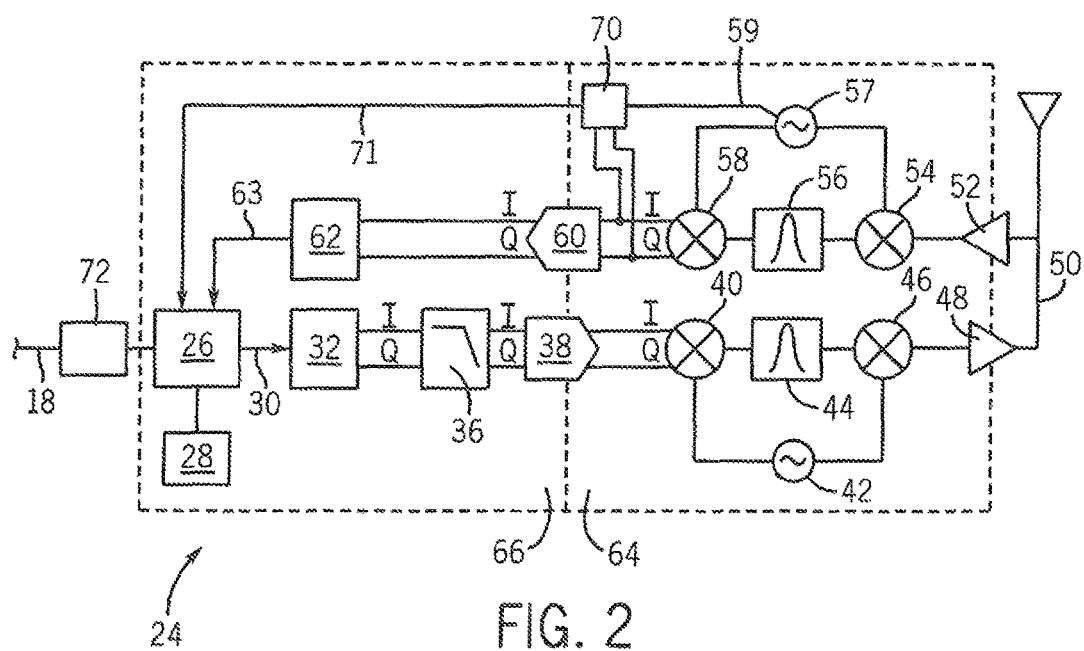
FIG. 2 is a block diagram of a transceiver of the type used by the mobile users and base stations also showing a modification used in the base stations only.

Referring now to FIG. 2, each of the wireless adapters 14 and base stations 16 may include a transceiver 24. Generally, similar transceivers 24 are used in both the network adapters and base stations 16; however, a receiver portion of the transceiver 24 is modified slightly for the base station 16 only, as will be described below. The depicted transceiver 24 is simplified and is one of many possible designs that can work with the present invention as will be understood from the following description to those of ordinary skill in the art.

Referring still to FIG. 2, during transmission, the transceiver 24 may receive data from a processor 26 communicating with a memory 28 and executing a stored program in the memory 28 to produce a data stream 30 to be transmitted over the wireless communication channel. This data stream 30, for example, may be data exchanged between the base stations 16 and the mobile devices 12 as part of standard network communication and may include network data authenticators for authorizing the user. When the transceiver 24 is in the base station 16, the processor 26 may operate simply to exchange data with the server 20 and is connected to a network card 72 connecting it to the earlier medium 18. When the transceiver 24 is in the mobile devices 12, the processor 26 may be the microprocessor of a laptop or other mobile device such as a cell phone, portable digital assistant, camera, music player or the like and the network card 72 is not required.

As is understood in the art, data of the data stream 30 will typically be organized in a frame including a data packet encoded by the data link layer for digital transmission to a node (either the base station 16 or mobile device 12). A frame will typically include a header synchronization section, a payload of network data, and a trailer, for example, of error correction codes or the like.

Within the transceiver 24, the data stream 30 will be received by a symbol encoder 32 which accepts sets of bits of each data packet in sequence and encodes them according to the particular encoding scheme used by the transceiver 24. In this example, it will be assumed that the transceiver 24 uses QPSK modulation (quadrature phase-shift keying) in which data is encoded in the phase of quadrature subcarriers of the transmitter radiowave. These quadrature subcarriers will be termed the in-phase subcarrier (I) and the quadrature-phase subcarrier (Q) and are separated in phase by 90°. While this modulation technique is assumed in the following example, it should be emphasized that the present invention can be used with a variety of other modulation systems including but not limited to 16-QAM, and 256 QAM.

Figure 10:
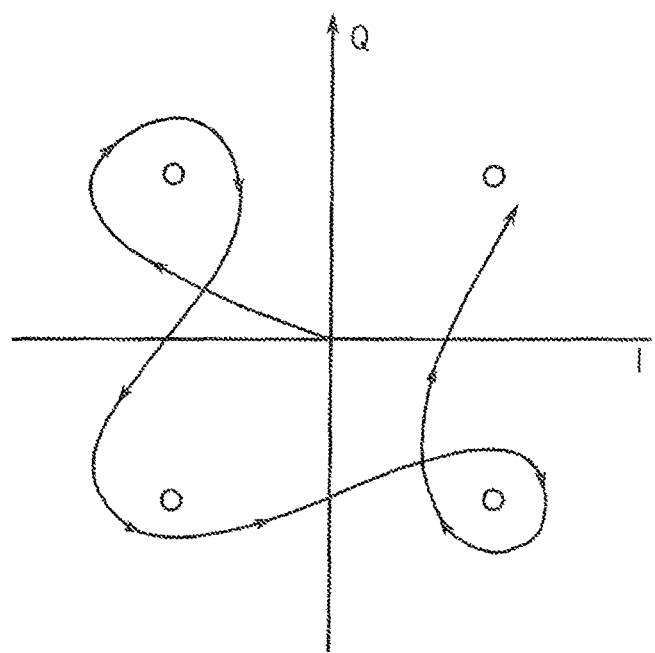
FIG. 10 an example of a possible phasor trajectory.

In general, a transmitter encodes discrete data onto a carder signal by continuously varying, or modulating in time some analog, that is to say, continuous property of the carrier signal. The receiver measures those variations and reconstructs signal's data payload according to the communication standard in use. Practitioners in the art use the term "phasor" to describe an instantaneous value of those modulated properties (state of the signal) at a given point in time (see FIG. 10). The exact relationship between phasor value and physical properties of a signal is defined by the communication protocol in use. Therefore, as time passes and signal's properties are changed by the transmitter, the phasor value changes accordingly. As instantaneous value of a phasor is most commonly described using two independent components known as I (in-phase component) and Q (quadrature component). In the art, a physical radio wave is then equivalent to the trajectory of the phasor in an abstract two-dimensional space commonly called I/Q or modulation domain. In fact, information may be encoded in higher-dimensional space, as is the case, for example, with MIMO (multiple input and multiple output) technology. Handling such cases would require only minor changes to the overall procedure, since, as long as the modulation format's number of symbols is finite, they can be mapped onto a two-dimensional space or multiple two-dimensional spaces.

The relationship between the dimensions of the modulation domain representation and waveform characteristics is determined by the communication protocol. For example, the I-dimension could correspond to the amplitude or the I-subcarrier at a point in time, and Q-dimension could be related to the phase of the Q-subcarrier. The exact relationships between waveform-domain representation and modulation-domain representation for the purposes of this invention are irrelevant, as long as they are known.

Therefore, we can treat phasor trajectory as the entity encoding information. However, keeping accurate track of phasor's trajectory is resource-intensive. Instead, practical systems periodically measure phasor's position at times dictated by the communication standard, and generally disregard phasor's intermediate transitions. Phasor values at these critical points in time form a "constellation" that serves as basis for analog-to-digital conversion, and a basis for representing identity in this invention.

One contributions of some embodiments of this invention is to base the notion of the transmitter's identity on the persistent device-specific properties of phasor trajectory of its signals that persistently manifest themselves regardless of the information encoded in the signal. Specifically, a signature, or a fingerprint of a specific device is based on some notion of difference between the phasor trajectory observed at the receiver and the phasor trajectory of the "ideal signal", i.e. theoretical signal generated by conceptual model of a perfect transmitter, unaffected by hardware impairments or channel distortion. The notion of the ideal reference signal is inevitably defined by the communication protocol in use, as part of the procedure for decoding of received signals.

Consumer-grade transceivers typically do not keep precise track of phasor trajectory, as doing so would require higher sampling rates and more capable hardware than what is minimally necessary to communicate in typical environments. Instead, phasor trajectory is periodically sampled at frequency determined by the communication standard, effectively producing a single position of the phasor corresponding to every elementary quantum of information encoded in the signal. Therefore, the most economical embodiment of the invention will represent phasor trajectory as a single point per quantum of information encoded in the signal, thereby leveraging capabilities of existing hardware.

Figure 7:
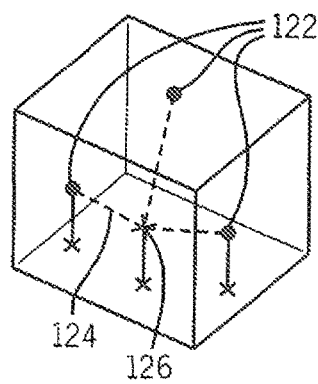
FIG. 7 is a simplified representation of a nearest neighbor classification algorithm.
Figure 8:
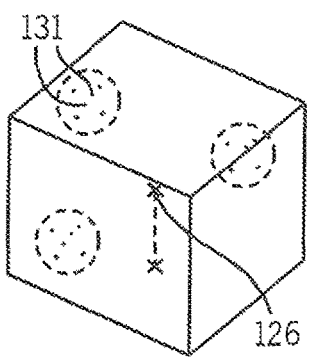
FIG. 8 is a simplified representation of a support vector machine algorithm suitable for use with the present invention.

In our implementation even such concise trajectory representation allowed degree of accuracy suitable for many applications. However, since in such embodiment most information about phasor trajectory is discarded, an embodiment designed to deliver maximal accuracy can benefit from a more enhanced and consequently costly receiver that is required strictly for data communication alone. Referring momentarily to FIG. 7, the QPSK modulation system provides a modulation "constellation" admitting four different encoding states or "symbols" represented by points 34a (with the I and Q phases positive), points 34b (with the I phase positive and the Q phase negative), points 34c, (with the I and Q phases negative), and points 34d (with the I phase negative and the Q phase positive). These four encoding points 34 permit the encoding of two bits per symbol with point 34a encoding bits 00, point 34d encoding bits 01, point 34b encoding bits 10, and point 34c encoding bits 11. Symbol encoder 32 thus takes pairs of bits and encodes them into I and Q phases represented, for example, as two voltages indicating positive or negative I and Q phase shifts.

The I and Q phases produced by the symbol encoder 32 may be subject to a baseband filter 36 band limiting the transmission of data (for example by metering the symbol values appropriately). The output of the baseband filter 36 may then be received by digital-to-analog converter 38 for conversion to analog I and Q values.

These phase values from the digital-to-analog converter 38 are received by a mixer 40 multiplying these values by appropriate quadrature carriers produced by a carrier oscillator 42 according to standard modulation techniques. The vector sum of the modulated phase values is then provided to an IF (intermediate frequency) filter 44 removing the out-of-band signal and then up-converted at up-converter 46 by a phase-locked, up-convening signal also from the carrier oscillator 42 (of different frequency than that provided to mixer 40). The output of the up-converter 46 is amplified by amplifier 48 and transmitted over antenna 50.

The transceivers 24 may also receive a modulated signal through the antenna 50. This signal is amplified by amplifier 52 and provided to down-converter 54 receiving a down converting signal from carrier oscillator 57 (possibly the same oscillator structure used for oscillator 42). The oscillator 57 must be closely phase (and frequency) locked to the incoming signal for phase detection and thus may employ phase and frequency lock circuit naturally providing a carrier frequency output signal which will be used as described below.

The output of down-converter 54 is received by IF filter 56 removing out-of-band signals and then demodulated by demodulator 58 receiving a quadrature demodulation signal from carrier oscillator 57 (typically a different frequency than that provided to the down converter 54). The output of the demodulator 58 is received by an analog-to-digital converter 60 (for example, a threshold detector) providing digital I and Q signals to a symbol decoder 62. The symbol decoder 62 matching the phase of the digital and Q signals per FIG. 7 then provides network data 63 to the processor 26.

The described circuitry of the transceiver 24 may be generally divided into an analog section 64 and a digital section 66. The analog section 64 holds the mixer 40, oscillators 42 and 57, the up converter 46 and down converter 54, IF filters 44 and 56, the demodulator 58, and amplifiers 48 and 52. The digital section 66 holds the symbol encoder 32, the symbol decoder 62, and the baseband filter 36. Digital-to-analog converter 38 and analog-to-digital converter 60 form bridges between the analog section 64 and the digital section 66.

Analog circuitry deals generally with continuous voltage and current ranges as understood in the art. Generally, the signals manipulated by the analog section 64 will vary continuously and slightly with slight changes in values of the analog components. Further minor changes in the signals in one section of the analog circuitry will cause additional changes in those signals in later sections of the analog circuitry as a result of the continuous functions implemented by typical analog circuitry. Within normal manufacturing tolerances and the tolerances imposed by standards such as IEEE 802.11, measurable differences in the resulting transmitted signal will be produced in the analog sections of different transceivers 24 for identical digital signals being modulated by different network cards. These differences manifest themselves as, for example, phase and amplitude variations that provide for the radiometric fingerprint used by the present invention.

Digital circuitry deals generally with discontinuous voltages providing discrete binary levels. For this reason, minor variations in the component values within normal manufacturing tolerances and the requirements of standards such as IEEE 8802.11 do not provide significant differences in the digital signals conveyed by the digital section 66. Further, minor changes in the digital signal in one part of the digital circuitry will normally not be propagated through the digital circuitry.

Referring still to FIG. 2, the transceiver 24, and in particular the receiver portion of the transceiver 24 in the base stations 16 only, is modified to measure modulation parameters of the received signals by the addition of a monitoring block 70. The monitoring block 70 captures naturally occurring signals in the analog section 64 of the receiver and digitizes them as radiometric information 71, sending them to the processor 26. Because the monitoring block 70 may make use of circuitry already present in the receiver, the monitoring block represents a relatively minor modification of the transceiver 24 of the base station 16 and may be readily implemented. Further, this modification is not required of the transceivers 24 of the mobile devices 12 allowing the present invention to scale well with additional users.

The monitoring block 70 may first capture frequency data 59 from the demodulation oscillator 57 and is phase locked to the frequency of the incoming signal from antenna 50. This frequency data 59 characterizes minor frequency shifts in the carrier signal of the received signal. In addition, the monitoring block 70 may receive one or more of the raw I and Q phase values per symbol from the demodulator 58 to detect minor variations in phase and amplitude of the carrier before digitization by the analog-to-digital converter 60. This radiometric information 71 from the monitoring block 70 is digitized, and provided to the processor 26 to be conveyed in the base stations by a network card 72 to the server 20.

Figure 3:
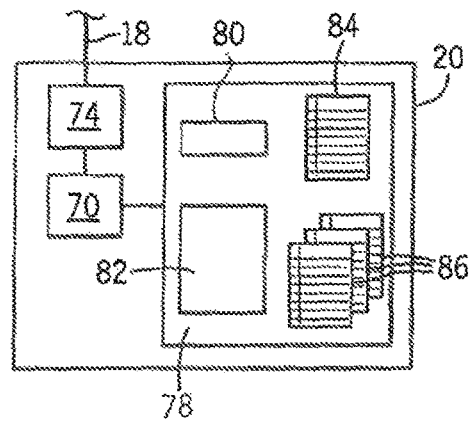
FIG. 3 is a block diagram of the central server of FIG. 1 such as may contain the radiometric identification program of the present invention, radiometric information, and network data authenticators for use by the invention.

Referring now to FIG. 3, the server 20 may include a network interface card 74 connecting it to the carrier medium 18 for receiving network data 63 and radiometric data 71. The network interface card 74 may communicate with a microprocessor 76, the latter of which connects via an internal bus with an electronic memory 78, for example, composed of hard disk and solid-state memory elements. The memory 78 may hold a network data authentication program 80 (employing network data authenticators) and a radiometric identification program 82 (employing modulation domain data) as will be described and which operate jointly to ensure network security. The memory 78 may also include NDA (network data authenticator) table 84 holding passwords or secure keys of the type known in the art and one or more radiometric identification tables 86 holding radiometric templates used for radiometric comparison as will be described.

Secure Operation of the Network

Commissioning a Mobile Device

Figure 4:
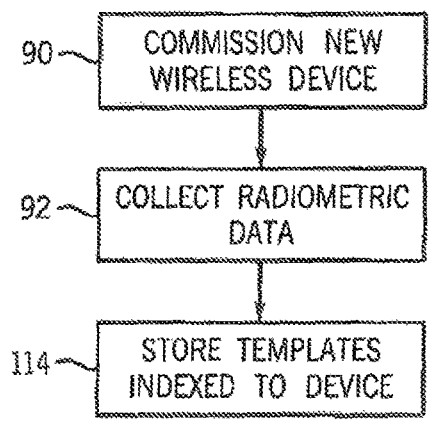
FIG. 4 is a flow chart of a program executed by the server of FIG. 3 during the commissioning of new mobile wireless device.

Referring now to FIGS. 1, 3 and 4, the authentication program 80 and radiometric identification program 82 may work together as indicated by process block 90 to commission a new mobile device 12. This process involves assigning a network data authenticator (e.g. a password or encryption key) to the user of the mobile devices 12 as will be required for entry onto the network 22. This network data authenticator may be assigned by a network administrator or may be generated in part by the user according to well-known techniques. The resulting authenticator is then stored in the NDA table 84 providing a "white list" of authorized network users. This authentication process may accept or transmit the authenticator data over the network itself or may use a more secure or different channel including but not limited to person-to-person transfer, mail or voice telephone communication.

At process block 92, the particular mobile device 12 being commissioned is operated for a period of time either in a controlled environment or during an initial login by the user required to exchange authenticator data. During this operation, radiometric data is collected from transmissions from the mobile device 12. This radiometric data may be collected by monitoring of arbitrary transmissions from the mobile device 12 or may use a special teaching transmission set intended to expose various modulation domain properties.

Figure 6:
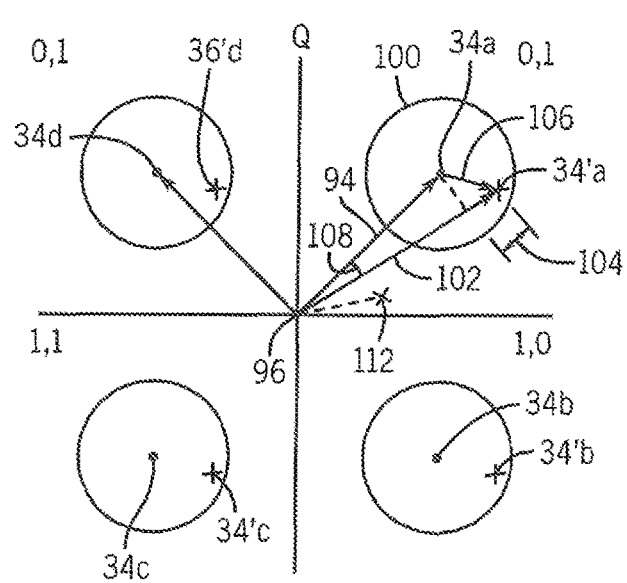
FIG. 6 is a constellation diagram of one type of quadrature modulation suitable for use with the present invention showing the radiometric information used by the present invention.

Referring momentarily to FIG. 6, modulation domain properties are generally those that make measurements of modulated qualities of the radiowave including, for example, those related to the frequency or phase. Many such measurements require modulation circuitry for detection and are not apparent in conventional time domain monitoring tools such as, for example, oscilloscopes. In a preferred embodiment of the invention, the radiometric data collected may include any of the modulation domain information provided in the following Table I.

TABLE I

| Radiometric Data Type | Short description |
| --- | --- |
| Symbol phase error | The angle between the ideal and measured phasors |
| Average (peak) phase error | The average (or peak) value of symbol phase errors within a single frame |
| Symbol magnitude error | The difference in the scalar magnitude between the ideal and measured phasors |
| Average (peak) magnitude error | The average (or peak) value of symbol magnitude errors within a single frame |
| Symbol error vector magnitude | The magnitude of the vector difference between the measured and ideal phasors |
| Average (peak) error vector magnitude | The average (or peak) magnitude of the vector difference between measured and ideal phasors of a frame |
| Frame I/Q origin offset | The distance between the constellation origin (0, 0) and the average of measured I/Q values of a frame |
| Frame frequency error | The difference between ideal and observed carrier frequencies |
| Frame SYNC correlation | Normalized cross correlation of the observed and the ideal SYNC preambles. This is the SYNC correlation of a frame. The larger the value, the higher the modulation quality. |

Each of these radiometric quantities may be derived from the analog section 64 used to convert digital data into transmittable radio signals by modulation, filtering, and up or down converting. These measurements may be distinguished from measurements such as signal transients, which are time domain measurements. The modulation domain outputs are characteristics of the radio transmitter and largely indifferent to the underlying data being transmitted or the network protocol.

Referring again to FIG. 6, these different radiometric measurements may be further explained by considering the point 34a as a point defined by the tip of an ideal phasor (vector) 94 leading from the origin 96 of the constellation diagram and representing the de-modulated phase of the transmitted signal. This ideal vector 94 shown, represents a perfectly modulated quadrature carrier having positive I and positive Q phases. It will be understood that similar ideal vectors 94 exist for each of the points 34b-d.

As a signal is received by the transceiver 24, an actual vector 102 may be measured representing an actual measured point 34a' of the transmitted signal. This vector 102 may be extracted before the analog-to-digital converter 60 by the monitoring block 70 and deviates from the ideal vector 94 defined by point 34a to be defined instead by a point 34a' that nevertheless remains within an acceptable boundary 100 for the particular modulation standard (for example 802.11). This actual vector 102 will have a different length from vector 94 and thus can be used to generate a scalar magnitude difference 104 with respect to ideal vector 94 (being their difference in length). This magnitude difference 104 is the symbol magnitude error described above and may be used also to calculate the average (peak) magnitude errors described above.

A difference vector 106 can also be defined between point 34a and 34a'. The magnitude (lanes) of this vector 106 provides the symbol error vector magnitude described above.

Vectors 94 and 102 have an angular phase difference 108. This angular phase difference 108 provides the symbol phase error and the average (peak) phase errors described above.

It will be understood that similar metrics can be derived for the other quadrants of the constellation and used for the average or peak measurements.

When multiple actual points 34' are averaged (in an average that includes equal numbers of symbols from each quadrant) they provide an average value 110 offset from the origin by an amount 112. This is the frame I/Q origin offset.

The frame frequency error is the difference between the carrier frequency and the ideal carrier frequency described with respect to oscillator 57 above and extractable from the phase frequency lock circuitry used in the receiver.

The frame SYNC correlation correlates an ideal frame SYNC signal with that actually detected and serves as a measurement of modulation quality. Normally each of these last three errors will be evaluated over multiple bits in a given transmission frame.

Referring again to FIGS. 1, 3 and 4, after radiometric information has been collected for the mobile device 12 to be commissioned, the collected radiometric information is stored as a radiometric template associated with a particular mobile device 12 and a network data authenticator (e.g., password) as indicated by process block 114.

In one embodiment, a single copy of these radiometric templates is stored in the radiometric identification tables 86 described above at the server 20 to be shared by both base stations 16. Alternatively, each base station 16 may provide its own radiometric identification table 86 reflecting the coloring of the modulation data of received signals as affected by the receiver of that base station 16. In this case, the commissioning process requires sequential data collection at each of the base stations 16 for the purpose of generating the radiometric templates. Alternatively, the receiver path of each base station 16 may be pre-characterized allowing radiometric data collected by a single base station 16 to be modified for use by the individual base stations 16 to create base station unique radiometric templates.

Authentication of a Commissioned Wireless Device

Figure 5:
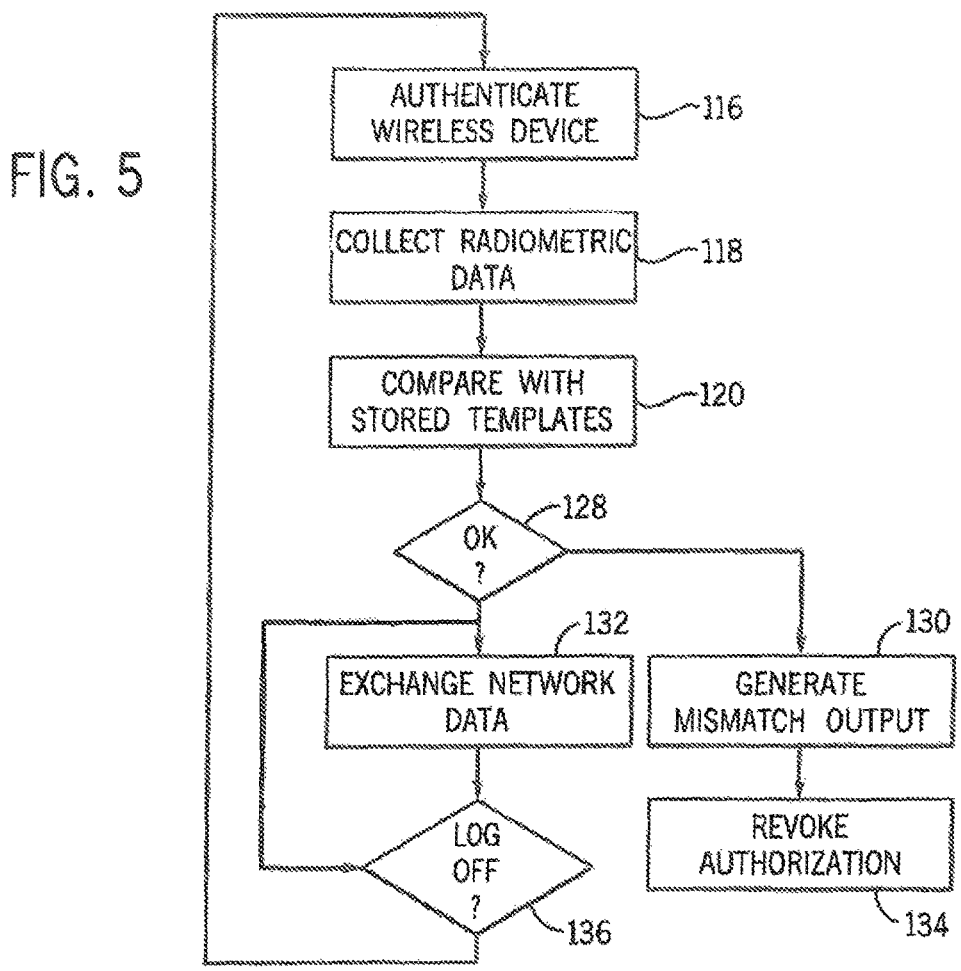
FIG. 5 is a flow chart of a program executed by the server of FIG. 3 during a typical authorization of a pre-commissioned mobile wireless device.

Referring now to FIGS. 1, 3 and 5, after the mobile devices 12 have been commissioned and radiometric templates established for their transceivers 24, the authentication program 80 and radiometric identification program 82 may work in conjunction to permit mobile devices 12 to log on to the network 22 and be authenticated for communication with the network 22. The beginning of this authentication process, as indicated by process block 116, uses the network data authenticators described above, such as a password or secure key or network fob or MAC address. This step relies on the transfer of digital data conventionally conveyed by wireless communication. In this authentication, the user provides an identification that is compared against the identifications in table 84 and used to identify the appropriate radiometric templates from table 66 associated with the user who is logging in.

At process block 118, radiometric data from the user logging in is collected either through a special authorization sequence executed by the mobile device 12 as prompted by the base stations 16 or by simply monitoring the communication of frames during process block 114.

At process block 120, the collected radiometric data is compared with the radiometric templates stored in table 86 (collected per process block 114 in the commissioning process) to detect possible impostors.

Referring now to FIGS. 1, 3, 5 and 7, this comparison process may use a variety of techniques and the present invention is not limited to any particular one of these comparison techniques. In the preferred embodiments, the comparison is made through individual ones or combinations of the known comparison techniques or their equivalents including: k-nearest-neighbor, support vector machines, decision trees, neural networks, Bayesian-based algorithms, polynomial classifiers, regression fitting, hidden Markov models, Gaussian mixture models, radial basis functions, classifier boosting, classifier ensembles The techniques of a "k-nearest neighbor" comparison or a "system vector machine" (SVM) comparison are described briefly below.

In the k-nearest neighbor approach, the radiometric templates stored in table 86 represent individual point 122 in an n-dimensional space where n equals the number of different radiometric parameters from Table I that will be used in a comparison process and which are embodied in the radiometric templates. In a preferred version of this embodiment of the present invention, frame frequency error, SYNC correlation, frame I/Q offset, frame magnitude error, and frame phasor error are used in that order of importance. It will be understood that variations in these subsets are also possible.

Each template point 122, in this case, is constructed by monitoring frames during process block 92 of the commissioning process, described above, and discarding half of the collected frames for each parameter furthest from their average in the n-dimensional space. The remaining frames are then averaged to produce a single n-dimensional point 122 stored in table 86 and indexed to the user identification obtained in process block 116.

The comparison of process block 120, in this case, analyzes the distance 124 from an average of the collected data 126 at process block 118 to the template point 122.

If that distance 124 is greater than a certain amount, then at decision block 128, the authorization of the mobile device 12 is rejected and the program proceeds to process block 130. At process block 130, the program may generate an output signal indicating a mismatched output to a system operator or a log entry. As noted, optionally at process block 134, the authorization of the mobile device 12 may be revoked either temporarily or until a reauthorization process per FIG. 5 maybe completed again. This revocation may be effected by removing or flagging the data in table 84.

On the other hand, if the average of the collected data 126 is within a predetermined distance of the indicated template point 122, then network connection is authorized and the program proceeds to process block 132 allowing the mobile device 12 access to the network 22.

Referring to FIGS. 1, 3, 5 and 8, in a second embodiment, the comparison process of process block 120 uses a support vector machine algorithm. In this embodiment, data points 131, obtained in process block 114, are collected into clusters identified to a particular mobile device 12 according to table 84 and stored as the radiometric templates. Data points 126 collected during the authentication process are compared to the cluster using a support vector machine algorithm which provides a confidence value indicating whether the collected data point 126 belongs to that cluster. This confidence value may be used like the threshold value above to determine the presence of an impostor if the confidence value is below a certain value. Again, depending on the confidence value at decision block 128, the program will branch to process block 130 or 132.

It will be understood that the sensitivity of the present invention may be varied by simply adjusting the threshold or confidence levels of the comparison process of process block 120 to either increase or decrease the security of the network. The present invention is intended to work together with an identifier, for example, secure key or password and to provide an augmentation of security or to increase security of an otherwise insecure system.

Figure 9:
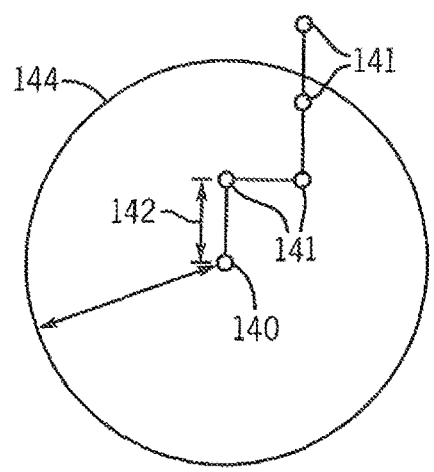
FIG. 9 is a detailed fragmentary view of one quadrant of quadrature constellation of FIG. 7 showing a possible strategy for heuristic modification of the radiometric fingerprints.

Referring now to FIGS. 1, 3 and 9, a trade-off between high levels of security and high levels of false negatives in the system may be implemented by allowing the evolution of the template stored in table 86 over a pre-established time period, for example, a given session being the time between logging in and logging out. In such a system, an initial template point 140 may be replaced with a later template point 141 so that the template value may evolve over time. Restraints on this process may be had by limiting the increment of evolution 142 per given time or session and providing a limit on the maximum evolution 144 until reauthorization. It will be understood that points 140 and 141 are points in n-dimensional space similar to that described with respect to FIGS. 8 and 9.

As described, the program for radiometric identification of the present invention is located in a server 20 shared among base stations 16; however, it will be recognized that the base stations 16 themselves may provide for this functionality and, in fact, there is no particular significance to how the authentication program is distributed among hardware components, this being a matter of engineering choice to the extent that it does not affect security

EXAMPLE I

The present invention was applied to differentiating among 138 identical IEEE 802.11 network interface cards and provided accuracy in excess of 99.99%. The optimal feature set for differentiation of network interface cards in order of positive effect on performance for SVM comparison was (1) frequency error, (2) SYNC correlation, (3) I/Q offset, (4) magnitude, and phase errors. For k-nearest neighbor comparison, the optimal feature set for differentiation of network interface cards in order of positive effect on performance was: (1) frequency error, (2) SYNC correlation, (3) I/Q offset. Interestingly, the set of network cards most susceptible to false rejections with SVM, were different from the set of network cards most susceptible to false rejections with k-nearest neighbor, so improved performance may be obtained by a combination of approaches to reduce false rejection rates. Details of the methodology of this experiment are provided in the attached appendix.

The present invention may also find use in identifying illegal transmitters based on fingerprints extracted from their illegal transmissions.

Alternative Embodiments

As noted, the present invention may base device identity of some notion of difference between the ideal and the observed phasor trajectories. The present inventors have determined that good performance is possible when the trajectory is represented by a single measurement per symbol. This approach has the advantage of minimizing the necessary modifications to the existing hardware designs.

However, in an alternative embodiment, performance can be improved further by collecting more fine-grained information about the phasor trajectory (this is a mathematical fact; informally, the more data the less chance of a mistake). Such optimization may require a more capable receiver but will allow to capture each symbol's signal state as a curve rather than a point, thus allowing use of additional metrics of deviation from the ideal signal. For example, in addition to analyses described here, curves could be represented using splines and wavelets, which are well-known in the art. Such mathematical entities can be defined as a set of numeric parameters. The difference in the corresponding parameters between the ideal and observed signal could serve as a basis for a new dimension of analysis.

In a further embodiment, further optimization can be derived from the fact that modulation fidelity of adjacent symbols is not independent. The correlation can be due to environmental factors as well as the fundamental properties of the transmitter hardware. In either case correlations between modulation errors of groups of symbols can be used to detect outliers or generate new ways to compare signals.

Analog transmissions of the same digital data by different transmitters differ, in part, due to relative reference-level differences between them. For example, one transmitter may be biased toward positive carrier frequency offset, while another to a negative offset. This happen while neither of them is aware of the inaccuracy nor has reliable means of measuring it. A further embodiment may focus on measuring such inaccuracies at the base station. However, a natural extension to the scheme would be for a sufficiently capable base station to alter characteristics of its outgoing signals based on the intended receiver to determine the point at which the receiver is unable to demodulate the signal, and use this information as an additional dimension of transceiver's signature.

For example, a receiver that is biased toward positive carrier frequency offset will fail to demodulate a signal whose carrier frequency offset is higher than some critical number. This critical number will be even higher for another receiver with a negative carrier frequency bias. The transmitter can use the difference between these critical values as another way of differentiating the receivers. Similar technique can be applied to other modulation accuracy metrics discussed here.

Advantages Over Prior Art

The main challenge of transmitter identification based on characteristics of its transmissions is dealing with noise and distortion. Performing signature extraction and comparison in the modulation domain is superior to prior approaches because it leverages existing signal processing facilities whose purpose is, essentially, to de-noise the signal for the purposes of data recovery.

For example, approaches based on signal transients during power-on ramps (waveform domain techniques) are necessarily performed at the lowest layer of measurement because transients are unstructured and it is difficult to tell which properties of the transient are due to the transmitter's hardware and which are due to noise. In contrast, the present invention leverages structural knowledge of the modulation scheme being used to separate intentional (due to transmitter) and unintentional (due to noise) features of the signal. In a sense, this approach operates at the last analog stage of the communication process where continuous (I/Q) values falling in certain ranges are mapped to discrete values, as specified by the modulation format.

The theoretical downside of this approach is that it requires knowledge of the modulation scheme being used (unlike transient-based approaches). However, this is a non-issue in the context of network security, where all necessary information is always available.

Moreover, knowledge of the signal's structure allows the invention to collect at least as many measurements as there are symbols in a signal (and more in practice), further improving resilience to noise since there is enough data to perform outlier removal, for example, by considering the middle quartile of measurements. In contrast, there is only one short transient per transmission, meaning that misclassifications need to be averaged out across entire transmissions, not symbols.

It is specifically intended that the present invention not be limited to the embodiments and illustrations contained herein, but include modified forms of those embodiments including portions of the embodiments and combinations of elements of different embodiments as come within the scope of the following claims.

We claim:

1. A radio frequency (RF) transceiver for securely communicating network data, the RF transceiver comprising:
    an analog radio section configured to receive a radio signal from an antenna, the analog radio section having a phase demodulation circuit configured to demodulate the radio signal to produce analog in-phase (I) and quadrature-phase (Q) signals;
    a monitor circuit configured to produce digital radiometric data from the analog I and Q signals, the digital radiometric data characterizing a modulation parameter of a transceiver of a device, wherein the modulation parameter provides a measure of a difference between ideal and measured values determined with respect to a constellation producing an error;
    an Analog to Digital Converter (ADC) configured to convert the analog I and Q signals to digital I and Q signals;
    a digital radio section configured to receive the digital I and Q signals from the ADC, the digital radio section having a decoder configured to match phases of the digital I and Q signals to symbols for decoding network data; and
    a processor executing a program stored in a non-transient medium operable to:
    receive each of digital radiometric data comprising an error and network data originating from a device;
    compare the digital radiometric data comprising the error to a plurality of radiometric templates corresponding to transceivers of a plurality of devices, each radiometric template comprising digital radiometric data characterizing a modulation parameter of a transceiver of a device, wherein the modulation parameter provides a measure of a difference between ideal and measured values determined with respect to a constellation producing an error, wherein the comparison provides a measure of difference between the error of the device and errors of the templates;

authenticate the device when the digital radiometric data matches a radiometric template of the plurality of radiometric templates as determined by the comparison to within a predetermined threshold;

generate an output indicating a possible security violation when the digital radiometric data fails to match a radiometric template of the plurality of radiometric templates as determined by the comparison to within the predetermined threshold.

2. The RF transceiver of claim 1, wherein the modulation parameter is a symbol phase error, a symbol magnitude error or a symbol error vector magnitude.

3. The RF transceiver of claim 2, wherein the digital I and Q signals are decoded using Quadrature Phase-Shift Keying (QPSK).

4. The RF transceiver of claim 1, wherein the digital radiometric data is compared to the plurality of radiometric templates using at least one of: k-nearest-neighbor, support vector machines, decision trees, neural networks, Bayesian-based algorithms, polynomial classifiers, regression fitting, hidden Markov models, Gaussian mixture models, radial basis functions, classifier boosting and classifier ensembles.

5. The RF transceiver of claim 1, wherein the comparison employs a combination of at least two different comparison algorithms operating independently to make a comparison and then combine the results.

6. The RF transceiver of claim 1, further comprising, upon the processor matching the digital radiometric data to a radiometric template corresponding to a transceiver of a device, authenticating a network data authenticator assigned to the device.

7. The RF transceiver of claim 6, wherein the network data authenticator is a password or encryption key.

8. The RF transceiver of claim 6, further comprising, when the digital radiometric data fails to match a radiometric template of the plurality of radiometric templates, revoking an authorization of the device.

9. The RF transceiver of claim 1, wherein the analog radio section further includes an amplifier configured to amplify the radio signal from the antenna and a filter configured to remove out-of-band signals from the radio signal.

10. The RF transceiver of claim 1, wherein the RF transceiver is configured to communicate the network data according to an IEEE 802.11 wireless standard.

11. The RF transceiver of claim 1, further comprising a Digital to Analog Converter (DAC), wherein the digital radio section further includes an encoder configured to produce digital I and Q signals, wherein the DAC is configured to convert the digital I and Q signals to analog I and Q signals, and wherein the analog radio section further includes a mixer configured to produce a radio signal from the analog I and Q signals.

12. The RF transceiver of claim 1, wherein the difference is between an ideal vector representing a perfectly modulated quadrature carrier and an actual vector representing a measured point.

13. A method for securely communicating network data using a radio frequency (RF) transceiver having analog and digital radio sections, the method comprising:

receiving a radio signal in the analog radio section from an antenna, the radio signal originating from a device;

demodulating the radio signal in the analog radio section to produce analog in-phase (I) and quadrature-phase (Q) signals;

producing digital radiometric data from the analog I and Q signals, the digital radiometric data characterizing a modulation parameter of a transceiver of a device, wherein the modulation parameter provides a measure of a difference between ideal and measured values determined with respect to a constellation producing an error;

using an Analog to Digital Converter (ADC) to convert the analog I and Q signals to digital I and Q signals;

receiving the digital I and Q signals in the digital radio section from the ADC;

matching phases of the digital I and Q signals to a symbol in the digital radio section for decoding network data; and receiving each of digital radiometric data comprising the error and the network data at a processor;

comparing the digital radiometric data comprising the error to a plurality of radiometric templates corresponding to transceivers of a plurality of devices, each radiometric template comprising digital radiometric data characterizing a modulation parameter of a transceiver of a device, wherein the modulation parameter provides a measure of a difference between ideal and measured values determined with respect to a constellation producing an error, wherein the comparison provides a measure of difference between the error of the device and error of the templates;

authenticating the device when the digital radiometric data matches a radiometric template of the plurality of radiometric templates as determined by the comparison to within a predetermined threshold; and generating an output indicating a possible security violation when the digital radiometric data fails to match a radiometric template of the plurality of radiometric templates as determined by the comparison to within the predetermined threshold.

14. The method of claim 13, wherein the modulation parameter is a symbol phase error, a symbol magnitude error or a symbol error vector magnitude.

15. The method of claim 14, further comprising the digital I and Q signals being decoded using Quadrature Phase-Shift Keying (QPSK).

16. The method of claim 13, wherein the digital radiometric data is compared to the plurality of radiometric templates using at least one of: k-nearest-neighbor, support vector machines, decision trees, neural networks, Bayesian-based algorithms, polynomial classifiers, regression fitting, hidden Markov models, Gaussian mixture models, radial basis functions, classifier boosting, and classifier ensembles.

17. The method of claim 16, wherein the comparison employs a combination of at least two different comparison algorithms operating independently to make a comparison and then combine the results.

18. The method of claim 13, further comprising, upon the processor matching the digital radiometric data to a radiometric template corresponding to a transceiver of a device, authenticating a network data authenticator assigned to the device.

19. The method of claim 13, further comprising, when the digital radiometric data fails to match a radiometric template of the plurality of radiometric templates, revoking an authorization of the device.

* * * * *